US011826717B2

United States Patent
Wien

(10) Patent No.: US 11,826,717 B2
(45) Date of Patent: Nov. 28, 2023

(54) MICROWAVE PYROLYSIS REACTOR

(71) Applicant: Scanship AS, Tonsberg (NO)

(72) Inventor: Asgeir Wien, Vollen (NO)

(73) Assignee: Scanship AS, Tonsberg (NO)

( * ) Notice: Subject to any disclaimer, the term of this patent is extended or adjusted under 35 U.S.C. 154(b) by 840 days.

(21) Appl. No.: 16/498,460

(22) PCT Filed: Mar. 26, 2018

(86) PCT No.: PCT/EP2018/057613
§ 371 (c)(1),
(2) Date: Sep. 27, 2019

(87) PCT Pub. No.: WO2018/177994
PCT Pub. Date: Oct. 4, 2018

(65) Prior Publication Data
US 2021/0106970 A1      Apr. 15, 2021

(30) Foreign Application Priority Data
Mar. 27, 2017   (NO) .................................. 20170493

(51) Int. Cl.
  *B01J 19/12*   (2006.01)
  *B09B 3/40*    (2022.01)
  *F23G 5/027*   (2006.01)

(52) U.S. Cl.
  CPC ............... *B01J 19/126* (2013.01); *B09B 3/40* (2022.01); *F23G 5/027* (2013.01)

(58) Field of Classification Search
  CPC ............ B01J 19/126; B01J 2219/00162; B01J 2219/00256; B01J 2219/0892;
(Continued)

(56) References Cited

U.S. PATENT DOCUMENTS

| 4,823,711 A | 4/1989 | Kroneberger et al. |
| 5,366,595 A | 11/1994 | Padgett et al. |

(Continued)

FOREIGN PATENT DOCUMENTS

| CN | 101020828 | 8/2007 |
| CN | 101020833 | 8/2007 |

(Continued)

OTHER PUBLICATIONS

Machine translation of WO 2006/103287 (Year: 2006).*

(Continued)

*Primary Examiner* — Xiuyu Tai
(74) *Attorney, Agent, or Firm* — Christian D. Abel

(57) ABSTRACT

The present invention provides a microwave pyrolysis reactor (1) comprising an inner pipe element (2), a microwave distribution element (3) and a housing (4), wherein the inner pipe element (2) is made of a microwave transparent material and comprises a first open end (5) and a second open end (6); the microwave distribution element (3) is made of a material not transparent to microwaves and is arranged around the inner pipe element (2), and comprises at least one opening (8) for allowing passage of microwaves into the inner pipe element (2); the housing (4) comprises a first inner surface enclosing a first annular space (9) around the microwave distribution element (3) and a port (13) for a microwave waveguide (14) in communication with the first annular space; and wherein the microwave distribution element is in thermal conductive contact with a heat exchange system for removal of heat from the microwave pyrolysis reactor during use.

16 Claims, 6 Drawing Sheets

(58) Field of Classification Search
CPC ........ B01J 2219/0879; B01J 2219/0877; B01J 2219/0867; B01J 2219/0875; B01J 2219/0852; B01J 2219/0894; B01J 19/087; B01J 2219/1227; B09B 3/40; F23G 5/027; C10B 19/00; C10B 53/00; C10B 49/02; C10B 33/12; C10B 7/14; C10B 3/07; C10B 7/10; C10B 1/00; C10B 25/20; C10B 1/04; C10B 7/06; C10B 45/00; C10B 53/02; C10B 43/02; C01G 25/02; B82Y 30/00; C01P 2004/64; H05B 6/70; H05B 6/802; H05B 6/6402; B01F 27/112; B01F 27/114; B01F 25/21; Y02E 50/10; Y02P 20/143
See application file for complete search history.

(56) References Cited

U.S. PATENT DOCUMENTS

| | | | |
|---|---|---|---|
| 5,387,321 | A | 2/1995 | Holland |
| 6,184,427 | B1 | 2/2001 | Klepfer |
| 2004/0024279 | A1 | 2/2004 | Mason |
| 2009/0047204 | A1* | 2/2009 | Kim .................. C23C 16/4401 423/349 |
| 2011/0019679 | A1 | 1/2011 | Akahane |
| 2016/0348211 | A1 | 12/2016 | Ugolin |

FOREIGN PATENT DOCUMENTS

| | | |
|---|---|---|
| CN | 101434846 | 5/2009 |
| CN | 102580650 | 6/2013 |
| CN | 104560074 | 4/2015 |
| CN | 204958818 | 1/2016 |
| CN | 105369497 | 3/2016 |
| CN | 105586095 | 5/2016 |
| CN | 106167712 | 11/2016 |
| EP | 0564359 | 6/1993 |
| EP | 2 947 961 | 11/2015 |
| GB | 10482 | 4/1910 |
| JP | 60-205169 | 3/1984 |
| JP | 07-002301 | 1/1995 |
| JP | 07-146079 | 6/1995 |
| JP | 10-504931 | 5/1998 |
| WO | WO2006/103287 | * 10/2006 |

OTHER PUBLICATIONS

Office Action from Japan Patent Office, submitted inter alia as a Stament of Relvance for any non-English refrence cited therein.
Search Report believed dated Oct. 26, 2020 from China Patent Office, cited inter alia as a statement of reference for all non-english references cited therein. The non-English language references were all identified as category "A"—Background art.
Email from applicant's local agent i China, reporting CN Search report and office action, indicating that the office action related to formal matters.
Norwegian Search Report dated Oct. 25, 2017, cited inter alia as a statement of relevance for non-English references cited therein, and previuosly cited in IDS filed Oct. 2, 2019. Of note is reference CN102580650 identified as category "Y"—particularly relevant when combined with another reference.
Norwegian Search Report dated Apr. 18, 2018, cited inter alia as a statement of relevance for non-English references cited therein, and previouly cited in IDS filed Oct. 2, 2019. All refernces cited therein identified as category "A".

* cited by examiner

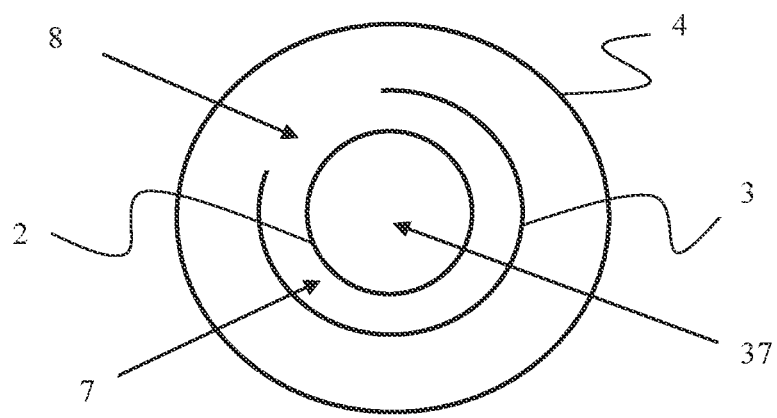
FIG. 2 (A-A)
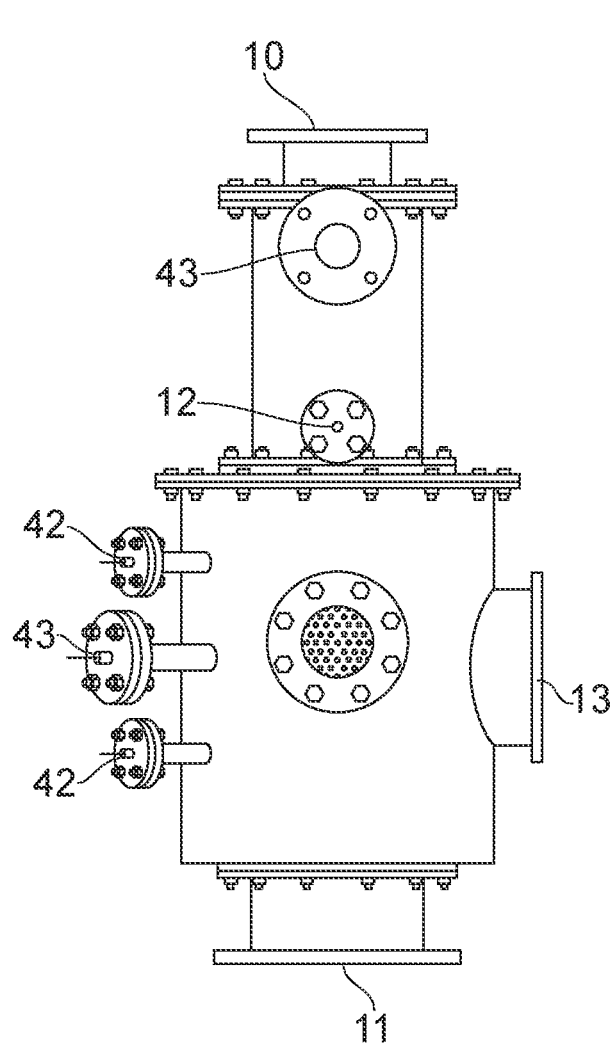
FIG. 3a
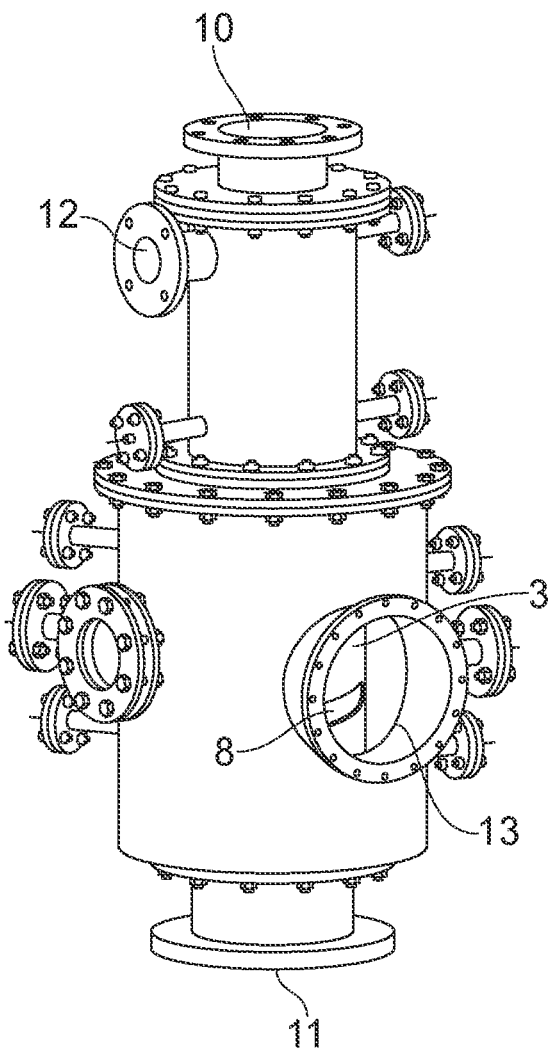
FIG. 3b

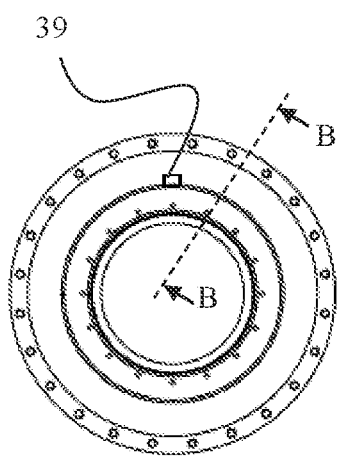 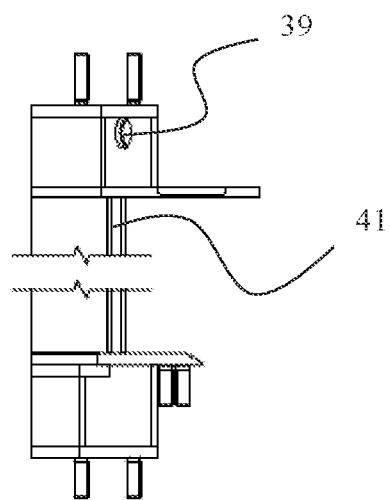
FIG. 8 (A-A)  FIG. 9 (A-A)

MICROWAVE PYROLYSIS REACTOR

TECHNICAL FIELD

The present invention relates to the field of microwave pyrolysis reactors, and more particularly to a microwave pyrolysis reactor suitable for waste disposal, use of such a microwave pyrolysis reactor in a waste disposal system and the waste disposal system comprising the microwave pyrolysis reactor.

BACKGROUND

Waste disposal and management off-shore, for instance on ships, is commonly obtained by combining the use of incinerators, collection of waste such as cooking oil, oil sludge, paper, plastics, cardboard and wood pallets for subsequent weekly landing on-shore, as well as the discharge of sewage sludge and food waste to sea. Consequently, the environmental footprint is quite large, especially in areas where the shipping traffic is high. This is especially noticeable in connection with cruise ships, wherein certain ports and ocean regions have numerous legislations prohibiting discharge to sea, as well as flue gas emissions. The latter prohibition applies to ships at port, and thus restricts the use of on-ship incinerators. Many of the same problems and issues regarding waste disposal and management are found in rural areas, islands and similar sites where access to large-scale waste disposal facilities are restricted.

In addition to common incinerators, pyrolysis systems have also been used in waste disposal systems. Pyrolysis is a thermochemical decomposition of organic material at elevated temperatures in the absence of oxygen, and in these systems, the pyrolysis reaction is obtained by an internal plasma arc or an external heating. The advantage of using a pyrolysis reactor instead of an incinerator is the low environmental impact in terms of air pollution and discharge of residues. In addition to char, the pyrolysis reactor produces syngas and/or bio oil, which may be used for fueling a boiler and/or a gas turbine to produce energy as heat or electric power. Although the known waste disposal systems, using such pyrolysis reactors, are in many ways superior to the systems using incinerators, there still remains a large potential for improvement.

A recent and important development in the art of pyrolysis is the microwave-assisted pyrolysis reactor. In these reactors, microwaves are used to heat the material to be pyrolyzed.

Waste disposal systems using microwave pyrolysis reactors for microwave-assisted pyrolysis are known. Examples of such systems are disclosed in for instance U.S. Pat. Nos. 5,387,321 and 6,184,427 B1. The physical principles, effects and advantages of using microwave-assisted pyrolysis in waste disposal and waste to energy applications are reviewed by Lam et al. *Energies* 2012, 5, 4209-4232.

The goal of the present invention is to provide a microwave pyrolysis reactor suitable for microwave-assisted pyrolysis of various types of waste in a waste disposal and/or treatment system. In particular, the present invention provides a microwave pyrolysis reactor, which has a simple construction, provides an excellent distribution of microwaves in the reactor, is robust regarding the type and size distribution of waste being pyrolyzed, is energy efficient, and which is not dependent on a complex solution for moving the waste to be pyrolyzed through the reactor. A further aim of the invention is to alleviate or remove at least some of the disadvantages of the prior art microwave pyrolysis reactors and waste disposal systems.

SUMMARY OF THE INVENTION

The present invention is defined by the appended claims and in the following:

In a first aspect, the present invention provides a microwave pyrolysis reactor comprising an inner pipe element, a microwave distribution element and a housing, wherein
- the inner pipe element is made of a microwave transparent material and comprises a first open end and a second open end;
- the microwave distribution element is made of a material not transparent to microwaves and is arranged around the inner pipe element and comprises at least one opening for allowing passage of microwaves from the outside of the microwave distribution element and into the inner pipe element;
- the housing comprises a first inner surface enclosing a first annular space around the microwave distribution element and a port for a microwave waveguide in communication with the first annular space;
- and wherein the microwave distribution element is in thermal conductive contact with a heat exchange system for removal of heat from the microwave pyrolysis reactor (more particularly for removal of heat from within the housing or the space defined by the inner surface of the housing and an outer surface of the inner pipe element) during use.

By being in thermal conductive contact with a heat exchange system, the microwave distribution element functions as a heat conducting element for the heat exchange system providing an increased heat transfer capacity.

In an embodiment of the microwave pyrolysis reactor, the microwave distribution element comprises the heat exchange system. In this embodiment, it is implicit that the microwave distribution element is in thermal conductive contact with the heat exchange system. Consequently, the microwave pyrolysis reactor may also be defined as comprising an inner pipe element, a microwave distribution element and a housing, wherein
- the inner pipe element is made of a microwave transparent material and comprises a first open end and a second open end;
- the microwave distribution element is made of a material not transparent to microwaves and is arranged around the inner pipe element and comprises at least one opening for allowing passage of microwaves from the outside of the microwave distribution element and into the inner pipe element;
- the housing comprises a first inner surface enclosing a first annular space around the microwave distribution element and a port for a microwave waveguide in communication with the first annular space;

and wherein the microwave distribution element comprises a heat exchange system for removal of heat generated in the microwave pyrolysis reactor during use In an embodiment of the microwave pyrolysis reactor, the heat exchange system comprises at least one fluid channel for a heat exchange fluid. The at least one fluid channel connected to a fluid inlet and a fluid outlet for the heat exchange fluid. The heat exchange fluid passing through the fluid channel during use of the pyrolysis reactor. The at least one fluid channel is in a heat conductive material.

In an embodiment of the microwave pyrolysis reactor, the at least one fluid channel is arranged on a surface of the microwave distribution element or arranged within the microwave distribution element (i.e. an internal fluid channel).

In an embodiment of the microwave pyrolysis reactor, the microwave distribution element is, or comprises, a hollow cylindrical element comprising an external surface facing the inner surface of the housing, and an internal surface facing the inner pipe element.

In an embodiment of the microwave pyrolysis reactor, the microwave distribution element is, or comprises, a hollow cylindrical element comprising a cylindrical wall having an external surface facing the inner surface of the housing, and an internal surface facing the inner pipe element.

In an embodiment of the microwave pyrolysis reactor, the at least one fluid channel is arranged at the external or internal surface of the hollow cylindrical element, or is an integral part of the microwave distribution element by being arranged between the external and internal surface of the hollow cylindrical element.

The at least one fluid channel may be at least one fluid pipe connected on an internal or external surface of the microwave distribution element, or an integral or internal part of the microwave distribution element. In an embodiment, the at least one fluid channel is an integral part of the microwave distribution element in the form of an internal fluid channel arranged between and/or adjacent the at least one opening or slots. In a preferred embodiment, the at least one fluid channel is a helical fluid channel arranged between the at least one slot of a helical slot arrangement.

In an embodiment of the microwave pyrolysis reactor, the housing comprises an inlet, a solids outlet and a gas outlet, wherein the inlet and the solids outlet are in communication with the first open end and the second open end of the inner pipe element, respectively. The housing may also comprise various ports for sensors, inlets for inert gas etc.

The microwave distribution element and/or the at least one opening is designed such that microwaves entering the at least one opening are at least partly reflected by an inner surface of the microwave distribution element and distributed within the inner pipe element in a longitudinal direction of the inner pipe element. The at least one opening allows passage of microwaves from the outside of the microwave distribution element, i.e. from the first annular space, and into the inner pipe element. The at least one opening may be of any suitable cross-section provided it has a size and shape allowing for the passage of microwaves from the first annular space and into the inner pipe element.

In one embodiment, the microwave distribution element is arranged around the inner pipe element, such that a second annular space is provided between the inner pipe element and the microwave distribution element. Preferably, the second annular space and/or the microwave distribution element extends along substantially the whole length of the inner pipe element.

The inner pipe element and the microwave distribution element are preferably concentric.

The first open end of the inner pipe element is suitable for receiving a material to be pyrolyzed, while the second open end of the inner pipe element is suitable for exit of a pyrolysis product.

In one embodiment of the invention, the inner pipe element, the inlet of the housing and the solids outlet form a flow path/conduit not in fluid communication with the first annular space around the inner pipe element.

The port for a microwave waveguide is arranged such that microwaves from a connected microwave waveguide will enter the annular space around the microwave distribution element during use. The microwave waveguide is connected to a microwave transmitter/source.

In an embodiment of the microwave pyrolysis reactor, the microwave distribution element is a hollow cylindrical element. The term "cylindrical" is intended to encompass any element defining a cylindrical main shape, i.e. a main shape suitable for being arranged around the inner pipe element. Thus, the term is considered to encompass a helical shaped element, a pipe element having at least one radial opening and similar.

In an embodiment of the microwave pyrolysis reactor, the at least one opening is arranged such that microwaves may enter the inner pipe element (or the second annular space) from at least two opposite radial directions of the microwave distribution element, or of the inner pipe element, during use. Preferably, the microwaves may enter from all radial directions of the inner pipe element, i.e. any radial direction relative the centerline of the inner pipe element. In other words, the at least one opening is arranged such that microwaves may pass through the at least one opening and into the inner pipe element from at least two opposite radial directions of the microwave distribution element, or the inner pipe element, during use.

In an embodiment of the microwave pyrolysis reactor, the at least one opening is arranged such that there is no fully overlapping openings on a diametric opposite side of the microwave distribution element, preferably such that there is no overlap of openings on diametric opposite sides of the microwave distribution element. In other words, the at least one opening is arranged such that there is no fully overlapping openings on diametric opposite sides of the microwave distribution element, preferably no overlapping openings on diametric opposite sides of the microwave distribution element.

In an embodiment of the microwave pyrolysis reactor, the at least one opening is at least one slot, preferably the at least one slot is shaped as at least a part of a helical shaped slot arrangement. The helical slot arrangement has preferably a lead angle such that the slot arrangement has no overlapping openings on diametrical opposite sides of the microwave distribution element.

In an embodiment of the microwave pyrolysis reactor, the microwave distribution element comprises multiple openings.

In one embodiment, the microwave distribution element of the microwave pyrolysis reactor comprises multiple slots providing a helical shaped slot arrangement.

In one embodiment, the microwave pyrolysis reactor comprises a microwave blocking section arranged between the inner pipe element and the port for a waveguide, such that microwaves entering through the port during use are prevented from direct impact on the inner pipe element. The microwave blocking section is preferably a slot-free section of the microwave distribution element, or a plate section arranged between the microwave distribution element and the housing, facing the port for a microwave waveguide and preferably having a cross-sectional area at least equal to the port for a microwave waveguide.

The distance between the inner surface of the microwave distribution element and the outer surface of the inner pipe is preferably as small as possible.

In an embodiment of the microwave pyrolysis reactor, the inner pipe element is arranged such that the first open end is at a higher vertical level than the second open end during use, preferably by having the inner pipe element arranged in a vertical direction.

In an embodiment of the microwave pyrolysis reactor, a waste transport element is arranged within or before/upstream the inner pipe element, the waste transport element able to move a waste material inside the inner pipe element from the first open end to the second open end, the waste transport element may for instance be a screw conveyor or belt.

In an embodiment of the microwave pyrolysis reactor, the inlet of the housing is part of an inlet section comprising a feed pipe having a first end and a second end, the inlet arranged at the first end of the feed pipe and the second end of the feed pipe extending inside the housing and facing the first end of the inner pipe element, such that a circumferential space is formed between the feed pipe and a second inner surface of the housing. The circumferential space is not in fluid communication with the first and the first annular space.

In an embodiment of the microwave pyrolysis reactor, the gas outlet is arranged at the second inner surface of the housing. Preferably, the gas outlet is arranged at a level above the level of the second end of the feed pipe. The gas outlet may optionally be arranged upstream the inner pipe element. The arrangement of the gas outlet depends on the direction of the inner pipe element.

In one embodiment, the microwave pyrolysis reactor comprises a vibration element able to provide vibration to the inner pipe element.

In one embodiment, the microwave pyrolysis reactor comprises a waste inlet chamber and a solids outlet chamber connected to the waste inlet and the solids outlet, respectively, of the housing.

In one embodiment of the microwave pyrolysis reactor, each of the waste inlet chamber and the solids outlet chamber comprises a first valve and a second valve for isolating the respective chamber, and a gas inlet and a gas outlet for nitrogen purging of the respective isolated chamber.

In a second aspect, the present invention provides a waste treatment system comprising a microwave pyrolysis reactor according to any of the preceding claims and a microwave waveguide connecting a microwave source to the port.

In one embodiment, the waste treatment system comprises means for providing waste to the inlet of the reactor and means for removal of solids exiting the solids outlet of the reactor.

In one embodiment of the waste treatment system, the microwave pyrolysis reactor comprises a solids outlet chamber connected to the solids outlet of the housing, the solids outlet chamber is connected to the solids outlet of the microwave pyrolysis reactor via a solids conveyor. The solids conveyor provides a fluid tight connection between the solids outlet and the solids outlet chamber.

In a third aspect, the present invention provides for the use of a microwave reactor according to the first aspect for microwave-assisted pyrolysis of a material susceptible to heating by microwaves.

The term "waste" is intended to comprise any type of material suitable for pyrolysis in a microwave pyrolysis reactor.

BRIEF DESCRIPTION OF THE DRAWINGS

The present invention is described in detail by reference to the following drawings:

FIG. 2 is a horizontal cross-sectional view of the microwave pyrolysis reactor in FIG. 1.

FIG. 3a is a side-view of the microwave pyrolysis reactor in FIG. 1.

FIG. 3b is a perspective side-view of the microwave pyrolysis reactor in FIG. 1.

FIG. 8 is a cross sectional view of an embodiment of the invention from FIG. 7.

FIG. 9 is a cut-away perspective view from an embodiment of the invention from FIG. 7.

DETAILED DESCRIPTION OF THE INVENTION

Figure 1:
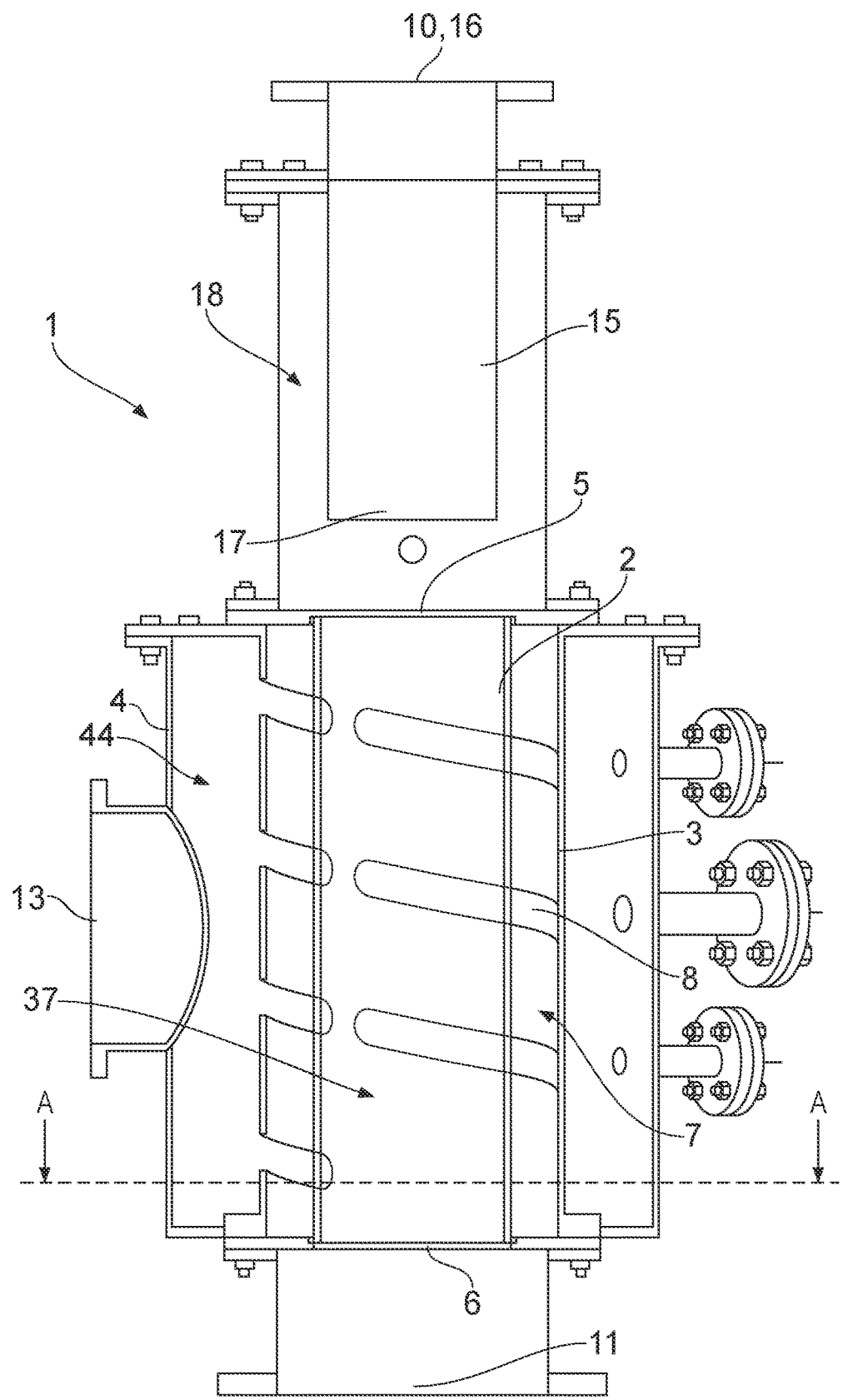
FIG. 1 is a vertical cross-sectional view of an exemplary microwave pyrolysis reactor.
Figure 4:
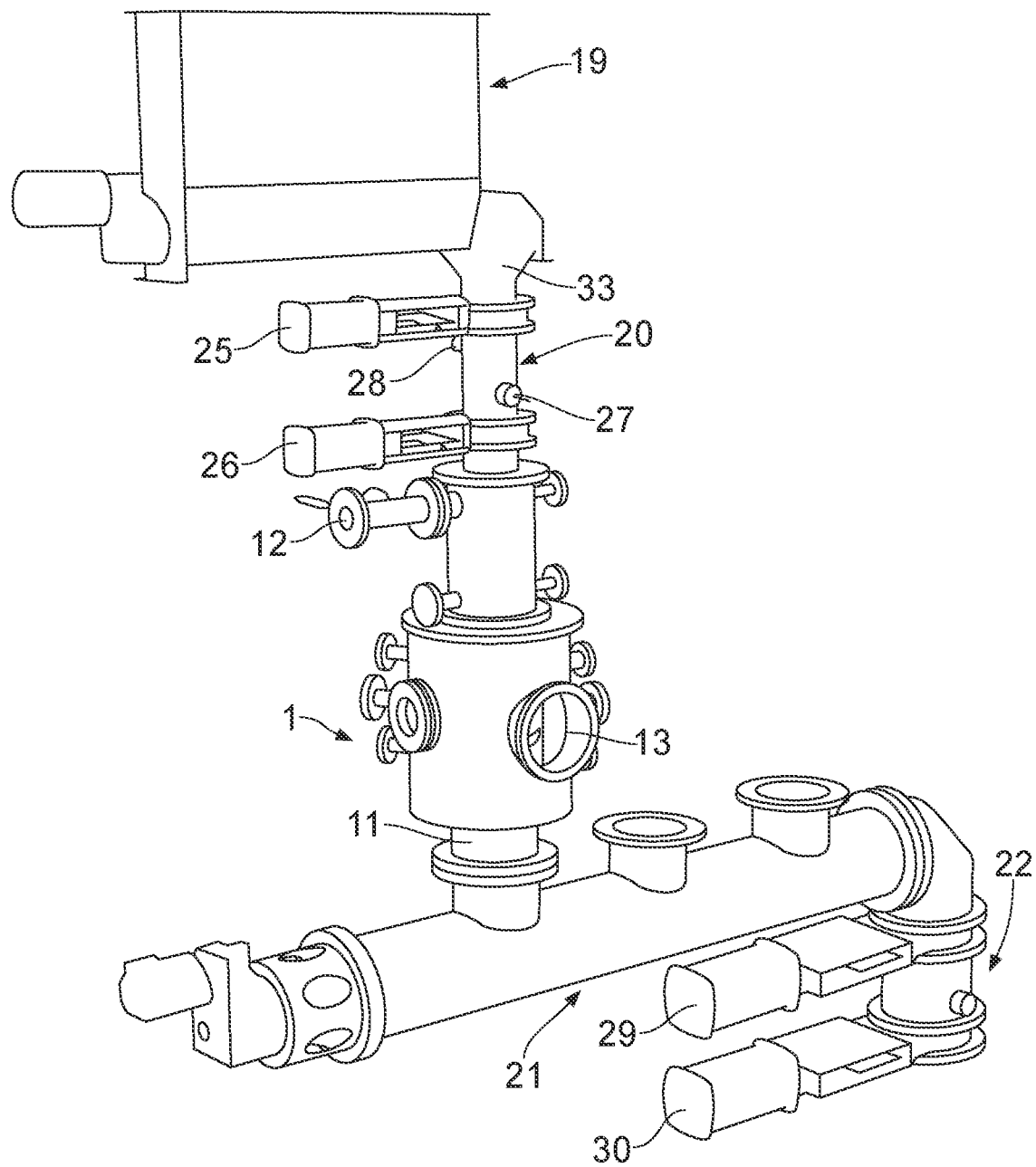
FIG. 4 is a perspective view of a waste disposal system comprising the microwave pyrolysis reactor in FIG. 1.

An embodiment of a microwave pyrolysis reactor according to the invention is shown in FIGS. 1-4. The reactor features an inner pipe element 2 made in a material that is transparent to microwaves. The pipe element has an upper end 5 (i.e. a first open end) and a lower end 6 (i.e. a second open end). An outer pipe element 3 (i.e. a microwave distribution element) is arranged around and concentric to the inner pipe element 2, delimiting a second annular space 7 between the inner pipe element and the outer pipe element. The housing 4 of the reactor, more particularly a first inner surface of the housing, encloses a first annular space 44 around the outer pipe element and features a port 13 for connecting the first annular space to a microwave waveguide. The waveguide is for transferring microwaves from a suitable microwave source, such as a magnetron or solid-state generator. The housing 4 features an inlet 10, a solids outlet 11 and a gas outlet 12. The inlet and the solids outlet of the housing is arranged to communicate with the upper end and the lower end of the inner pipe element, respectively. The gas outlet 12 is arranged above the upper end of the inner pipe, such that the gas developed in a pyrolysis process is allowed to escape/exit the reactor. The solids inlet 10 of the housing is part of an inlet section comprising a feed pipe 15 having a first end 16 and a second end 17, the solids inlet is arranged at the first end 16 of the feed pipe and the second end 17 of the feed pipe extends inside the housing and faces the upper end 5 of the inner pipe element. A circumferential space 18 is formed between the feed pipe and the housing (i.e. a second inner surface of the housing). To avoid or minimize having solid waste material being transported towards the gas outlet 12, due to the flow direction of the gaseous product, the gas outlet is arranged at the second inner surface of the housing at a level above the second end 17 of the feed pipe.

The inner pipe element 2 together with the inlet and the solids outlet of the housing is part of a flow path/conduit 37 not in fluid communication with the annular space around the inner pipe element.

The wall of the outer pipe element features multiple slots 8 (i.e. openings) arranged in a helical configuration (i.e. a helical slot arrangement). During use, microwaves entering the reactor via the port 13 will enter the inner pipe element via the slots. The slots (i.e. the at least one opening) are arranged around the inner pipe element, such that the microwaves may enter the inner pipe element from substantially all radial directions of the inner pipe element and/or the microwave distribution element. The effect of the outer pipe element is to provide a more even distribution of the microwaves impacting a waste material inside the inner pipe element. This in turn provides for a more homogenous heating of the material. Further, by ensuring an even distribution of the microwaves, sections/areas of the inner pipe element are not heated excessively, i.e. do not reach temperatures that may damage the material of the inner pipe element and/or decrease its lifetime. A further advantage of the outer pipe element is that only a single port 13 into the reactor is required to obtain a homogenous microwave distribution along the whole inner pipe element.

In the disclosed embodiments, the microwave distribution element is a separate pipe-shaped element providing a second annular space around the inner pipe element. However, the advantageous distribution effect obtained by this element is not dependent on the second annular space. In fact, the effect appears to be improved by minimizing the width of the second annular space (i.e. the distance between the inner surface of the outer pipe element and the outer surface of the inner pipe element). Thus, in some embodiments the microwave distribution element may be a coating on the inner pipe element. Similar to the outer pipe element 3, the coating is made of a material not transparent to microwaves and arranged to provide openings for allowing microwaves into the inner pipe element.

In use, the microwave pyrolysis reactor is arranged with the inner pipe element in a vertical direction having the inlet 10 of the housing and the upper end 5 of the inner pipe element arranged at a level above the solids outlet 11 of the housing and the lower end of the inner pipe element. This provides several advantages including the feature that a waste material to be pyrolyzed is passed through the reactor simply by use of gravity. Further, during pyrolysis, gaseous or volatile products (mainly hydrocarbon gas/vapors) formed in a lower part/level of the inner pipe element will rise through the inner pipe element and interact with the waste material situated at a higher level in the inner pipe. The gaseous products have commonly a much higher microwave absorption capability than the waste material being closer to the inlet of the housing, and the resulting effect is consequently an increased microwave absorption in said waste material. The latter effect is highly advantageous since it allows for a more effective pyrolysis of the waste materials. This effect may even provide for the effective pyrolysis of materials that would otherwise require the addition of microwave absorbent additives, such as char, to obtain an effective pyrolysis.

As mentioned above, in this specific embodiment, the slots of the microwave distribution element are arranged in a helical configuration. However, a useful or suitable homogenizing effect on the microwave distribution may be obtained by other slot configurations. Further embodiments, wherein the slots are replaced by openings having various cross-sectional areas, such as circular, elliptic and polygonal are thus envisioned. A requisite is that the openings are dimensioned to allow passage of microwaves from the first annular space and into the inner pipe element. Further, the openings are preferably arranged such that openings do not fully overlap on diametric opposite sides of the outer pipe element. By avoiding such overlap, most of the microwaves are reflected and distributed within the second annular space in the longitudinal direction of the inner pipe element.

The microwave pyrolysis reactor comprises multiple temperature sensors 42 and pressure sensors 43. The sensors monitor the temperature conditions as well as the pressure at the gas outlet 12 (or in the circumferential space 18) and the pressure in the first annular space 44. When used in for instance a waste disposal system as described below, the various sensors are connected to a suitable control and monitoring system (not shown).

The main units of a waste disposal system, featuring a microwave pyrolysis reactor 1 as described above, is shown in FIG. 5. In addition to the microwave pyrolysis reactor, the system comprises a waste container 19, a waste inlet chamber 20, a solids conveyor 21 and a solids outlet chamber 22. The waste container comprises a waste outlet 33 and have a screw conveyor 23 (the screw is not shown) arranged to provide a waste material to the inlet 24 of the waste inlet chamber. The waste inlet chamber comprises an upper valve 25 (i.e. an inlet valve) and a lower valve 26 (i.e. an outlet valve). The valves are able to isolate the waste inlet chamber such that oxygen may be purged from the waste material by use of nitrogen before it enters the microwave pyrolysis reactor 1. The nitrogen is supplied via the gas inlet 27 and released via the gas outlet 28. The solids conveyor 21 is connected to the solids outlet of the microwave pyrolysis reactor and comprises an enclosed internal screw conveyor 34 (not shown). The screw conveyor is arranged to transport the solids exiting the microwave pyrolysis reactor to the solids outlet chamber 22. Other means for transport of the solids in the solids conveyor, such as belts, may also be used. The solids conveyor is dimensioned (i.e. have a length and/or circumference) such that the solids exiting the microwave pyrolysis reactor is allowed to cool sufficiently before they reach the solids outlet chamber. It is contemplated that the solids conveyor may comprise a heat exchange system for improving the cooling of the solids exiting the solids outlet 10. In addition to improving the cooling of the solids, such a heat exchange system may for instance be used to utilize the heat in various auxiliary systems, such as pre-heating of water.

The solids conveyor comprises temperature probes to monitor the temperature of the solids during transport from the solids outlet 11 to the solids outlet chamber 22. The solids outlet chamber 22 comprises an upper valve 29 (i.e. an inlet valve) and a lower valve 30 (i.e. an outlet valve). The valves are able to isolate the solids outlet chamber such that oxygen or air is prevented from entering the solids conveyor (and consequently the microwave pyrolysis reactor). Similar to the waste inlet chamber, any oxygen in the solids outlet chamber may be purged by use of nitrogen via a gas inlet 31 and a gas outlet 32 (not shown). The solids outlet 35 of the solids outlet chamber is commonly connected to a solids container 36 (not shown) for temporary storage of the solids. Similarly, the gas outlet 12 of the microwave pyrolysis reactor is connected to a gas handling system (not shown) for processing and/or storage. The gas handling system comprises at least a suction device (commonly a pump—not shown in the figs.). The suction device ensures that the internal volume of the inner pipe element, as well as the internal volume of the reactor in direct fluid communication with the inner pipe element, is kept at a pressure below ambient. In addition to improving the transport of the gaseous products out of the microwave pyrolysis reactor, the below ambient pressure provided by the suction device ensures that any accidental leakage of gas from the internal volume of the inner pipe to the surroundings (for instance due to a faulty sealing) are minimized or avoided. Further, any leakage in the system may be detected by monitoring the pressure within the inner pipe or the annular space between the inner pipe and the housing. The gas handling system may additionally comprise any suitable device or system for generating heat and/or electric power, such as a gas driven generator or an oil furnace.

In use, a waste material is first provided to the waste container 19. The waste container may for instance be connected to, or constitute a part of, a shredder, a pelletizer and/or waste storage hopper for providing waste material on a form suitable for introduction to the reactor. In a feeding sequence, the waste material, preferably a pelletized waste material, is transported to the outlet 33 of the waste container, the upper valve 25 of the waste inlet chamber is opened and the waste material introduced into the waste inlet chamber. After introduction, the upper valve is closed and the waste inlet chamber purged by nitrogen via the gas inlet 27 and the gas outlet 28. After purging, the lower valve is opened and the waste material allowed to enter the microwave pyrolysis reactor via the upper inlet 10 due to gravity. The lower valve is closed and the waste material is pyrolyzed by use of microwaves from a microwave waveguide connecting a microwave source to the port 13.

A level sensor arranged in the reactor detects when a suitably low level of material in the inner pipe element is reached, and the above feeding sequence is repeated to provide a new batch of waste material to the reactor. Initially, the waste material in the inner pipe element is at the same level of pyrolysis throughout the inner pipe element, however, after a certain time with repeated batches of introduced material, the material closest to the solids outlet 11 is fully pyrolyzed, i.e. is predominantly char, while the material closest to the inlet 10 is not.

After entering the microwave pyrolysis reactor through the port 13, the microwaves enter the annular space 7 and the inner pipe element via the slot(s) 8, and are distributed along and into the inner pipe element 2. During pyrolysis, the waste material is mainly transformed to solids and gaseous material, wherein the solids consist predominantly of char and the gaseous material consists predominantly of hydrocarbon gas/vapors. Commonly, the pyrolysis is run within a temperature range of 300-600° C. The hydrocarbon gas/vapors are allowed to exit the reactor via the gas outlet 12. When pyrolysis of at least a lower portion of the waste material, i.e. the portion closest to the solids outlet 11 of the reactor, is completed, the solids conveyor 21 moves the solids towards the solids outlet chamber 22. An advantage of having the inner pipe element arranged in a vertical direction is that any hydrocarbon gas/vapor developed in the process will pass through the waste material, which is between the position where the gas is developed and the gas outlet. This feature provides an increased microwave absorption of the waste material as discussed above.

When the solids outlet is full, the upper valve 29 is closed and the lower valve is opened, such that the solids are allowed to exit the solids outlet chamber. After exit of the solids, the lower valve 30 is closed, the solids outlet chamber purged of oxygen with nitrogen, and the upper valve 29 opened to receive a new batch of solids. Commonly, the solids outlet chamber is connected to a solids container for intermediate storage of the solids.

Both the waste inlet chamber and the solids outlet chamber may comprise an arrangement for evacuating gas/air out of the chamber, for instance a gas valve connected to a suction device. By combining the nitrogen purging with a prior evacuation of the chamber, the required amount of nitrogen gas may be reduced.

Figure 5:
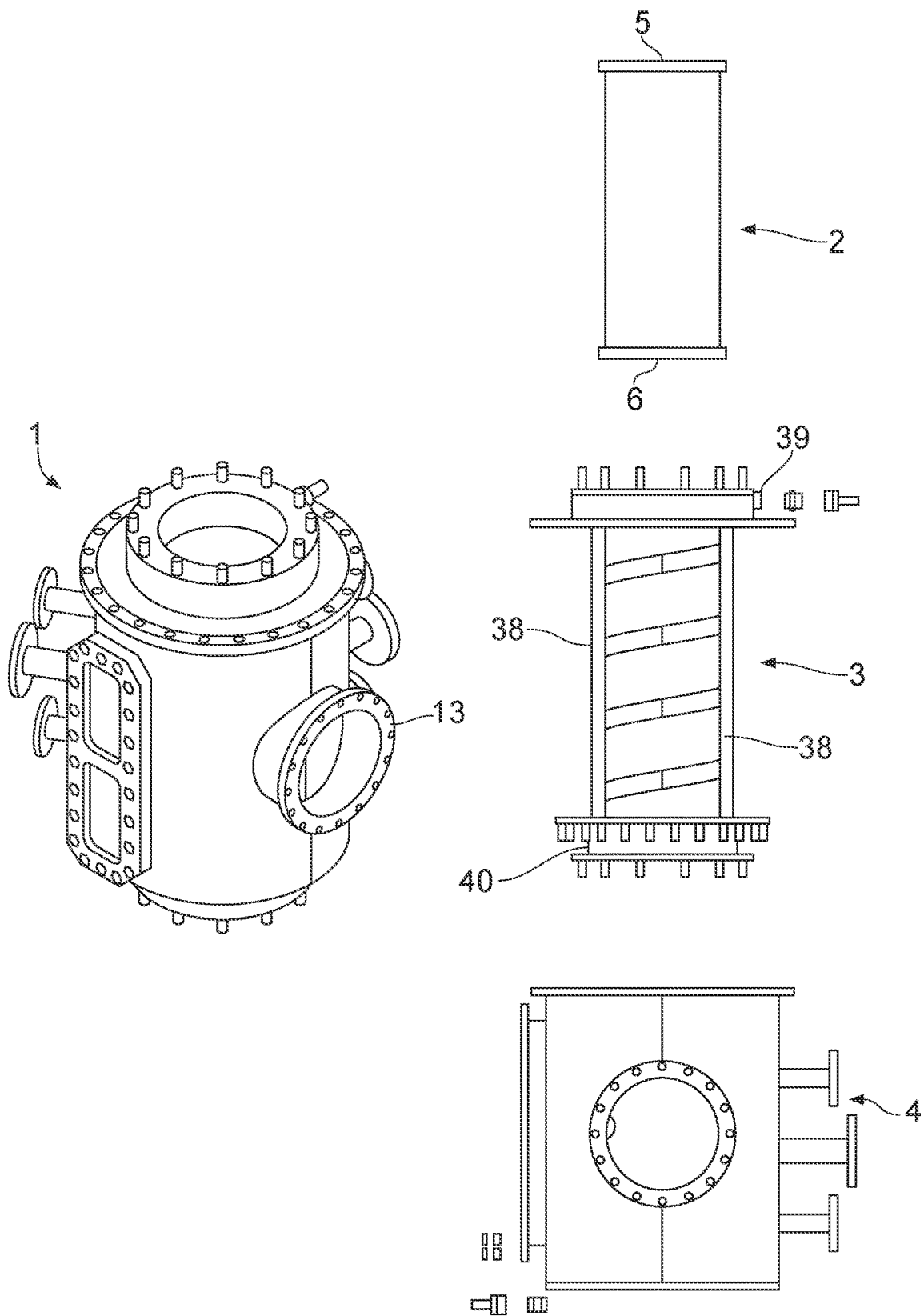
FIG. 5 is a perspective view of a microwave pyrolysis reactor according to the invention and an exploded side view of the same.
Figure 6:
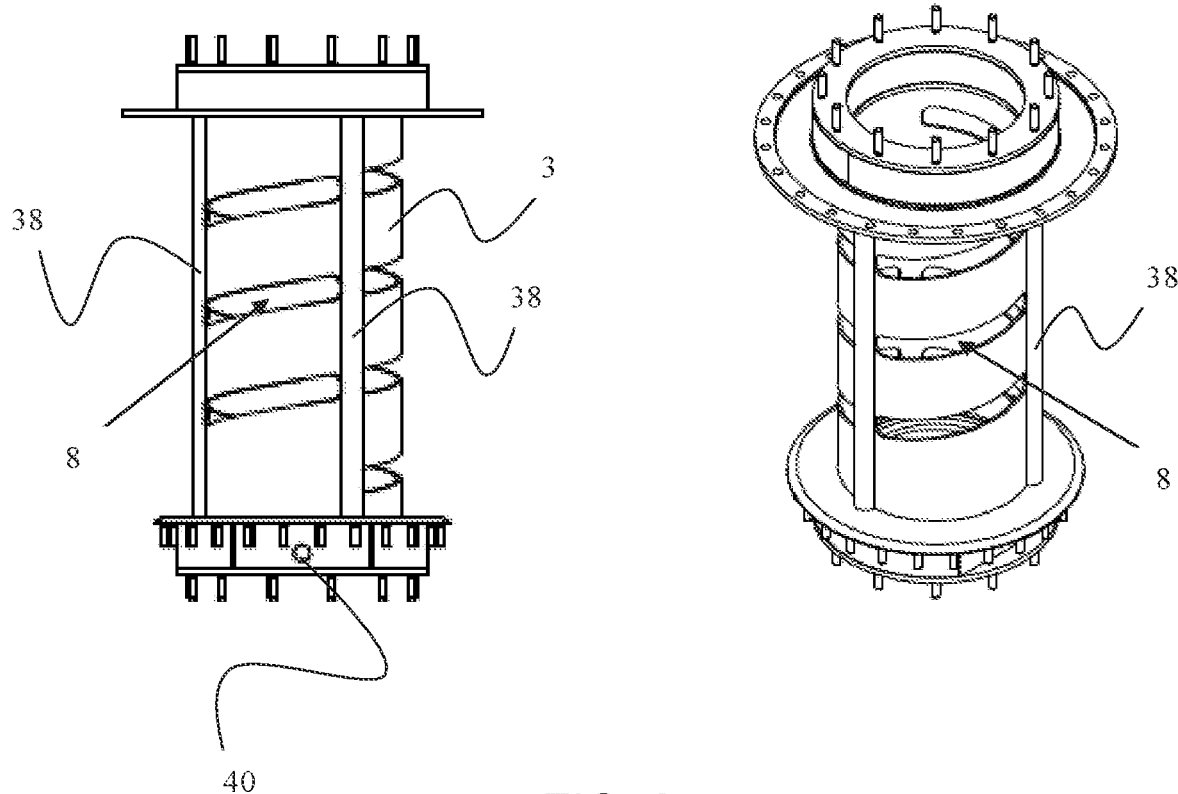
FIG. 6 is a detailed side view and a perspective view of the microwave distribution element of the microwave pyrolysis reactor in FIG. 5.

A further embodiment of a microwave pyrolysis reactor is shown in FIG. 5, and a detailed view of the microwave distribution element is shown in FIG. 6. The microwave pyrolysis reactor has most of the main technical features in common with the reactor in FIGS. 1-4, and said features are given the same reference numbers. For illustrative purposes, the reactor in FIG. 5 is shown without a gas outlet and an inlet section as disclosed in FIGS. 1-4. The arrangement and design of an inlet section and a gas outlet will depend on, for example, the direction of the inner pipe element and whether a material to be pyrolyzed is transported through the inner pipe element by gravity or by use of other means for transport (i.e. a screw conveyor, belt etc.). In one embodiment, the reactor in FIG. 5 may comprise an inlet section and gas outlet as described for the reactor in FIGS. 1-4. In view of the reactor in FIGS. 1-3, the main differential feature of the reactor and the microwave distribution element in FIGS. 5 and 6 is that the outer pipe element 3 (i.e. the microwave distribution element) comprises a heat exchange system for removal of heat from within the microwave pyrolysis reactor during use. The heat exchange system comprises three fluid channels 38 (i.e. fluid pipes) on the outer pipe element (i.e. the fluid channels are arranged on an external surface of the microwave distribution element), the fluid channels are connected to a common fluid inlet 39 and a common fluid outlet 40 for a heat exchange fluid. This feature is highly advantageous when the reactor is to be used in environments, wherein the temperature of the housing is not allowed to exceed certain temperature limits. Further, having a heat exchange system for removal of heat from within the pyrolysis reactor provides further advantages in that excess heat from the reactor may be utilized in various auxiliary systems, such as in preheating of water, power generation and similar. By having the heat exchange system arranged in heat conducting contact with the outer pipe element 3, the outer pipe element functions as a heat conductive element for the heat exchanger. That is, the outer pipe element functions in a manner similar to a heat transfer fin/baffle/plate as used in known heat transfer systems. In addition, the outer pipe element is arranged close to the inner pipe element, within which the heat is generated, and an optimum temperature difference/gradient and heat transfer are obtained. The feature of having a heat exchange system for removal of heat from within the microwave pyrolysis reactor provides yet an advantage in that differences in the thermal expansion of the inner pipe element and the housing are minimized. These differences may otherwise cause material stress on the inner pipe element, leakages between the inner pipe element and its connection to the housing etc.

Figure 7:
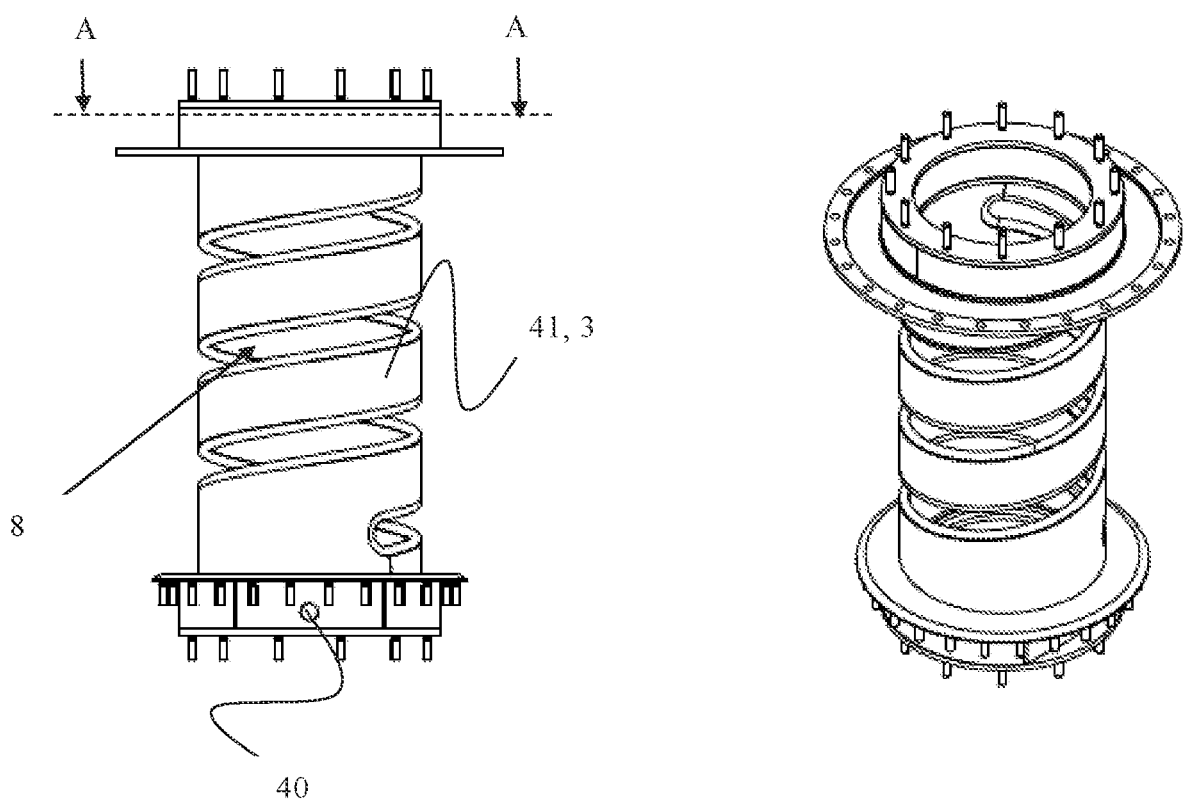
FIG. 7 is a detailed side view and a perspective view of a further embodiment of a microwave distribution element suitable for a microwave pyrolysis reactor according to the invention.

An alternative design of a heat exchange system as described above is shown in FIGS. 7-9. In this design, the heat exchange system features a helical fluid channel 41 arranged within the wall of the outer pipe element 3 (i.e. the fluid channel is arranged between an external and an internal surface of the microwave distribution element). By having the fluid channel as an integral part of the helical design, the heat capacity of the heat exchange system may be increased without compromising the helical slot arrangement, which provides an excellent microwave distribution. However, the same advantage may be obtained when used in microwave distribution elements having other suitable arrangements of slots and/or openings.

Suitable microwave transparent materials for use in the inner pipe element 1 include glass materials such as borosilicate or quartz, as well as various ceramics having low dielectric loss, such as boron nitride based ceramics.

The use of microwaves to heat the material to be pyrolyzed entails that said material should preferably have certain intrinsic properties, i.e. having an electric dipole and a high ability to absorb microwaves at a wavelength λ of between 12 cm and 32 cm. In many instances, the waste materials will be highly heterogenous, and not all will possess the required properties for effective microwave heating. In the latter case, it may be required or advantageous to mix the waste material with an auxiliary microwave absorbent material prior to introduction in the microwave pyrolysis reactor. Such auxiliary material may for instance be char previously produced in the microwave pyrolysis reactor. However, when the inner pipe element is arranged in a vertical direction as discussed above, such auxiliary material is usually not required.

In the embodiments shown in FIGS. 1-5, the inner pipe element is arranged in a vertical direction such that a waste material to be pyrolyzed may be transported/moved through the inner pipe element by use of gravity only. However, this arrangement is not essential for obtaining a highly advantageous microwave pyrolysis reactor. In other embodiments, the system or reactor may comprise further means for transporting/moving the waste material, and the inner pipe element may be arranged in any suitable direction. The highly advantageous effect of the microwave distribution element as discussed above is independent on the direction of the inner pipe element and the means for transporting/moving a waste material through the inner pipe element.

The disclosed microwave pyrolysis reactor is primarily described by its use in the disposal of waste materials, wherein the obtained products, e.g. char, oil, gas and tar, are not the main goal of the pyrolysis process. However, the obtained products are valuable and it is envisioned that the reactor may be used in processes, wherein the obtained products are the main goal. Such processes may for instance be the production of biofuel by pyrolysis of wood-based raw materials and similar.

Further, due to the energetic products obtained and the advantageous heat exchange system, it is envisioned that the microwave pyrolysis reactor and any suitable auxiliary system may be used for the main purpose of energy production, i.e. as a power plant.

The invention claimed is:

1. A microwave pyrolysis reactor comprising an inner pipe element, a microwave distribution element and a housing, wherein
   the inner pipe element is made of a microwave transparent material and comprises a first open end and a second open end;
   the microwave distribution element is made of a material not transparent to microwaves and is arranged around the inner pipe element, and comprises at least one opening for allowing passage of microwaves into the inner pipe element;
   the housing comprises a first inner surface enclosing a first annular space around the microwave distribution element and a port for a microwave waveguide in communication with the first annular space; and wherein the microwave distribution element is in thermal conductive contact with a heat exchange system for removal of heat from the microwave pyrolysis reactor during use.

2. The microwave pyrolysis reactor according to claim 1, wherein the heat exchange system comprises at least one fluid channel for a heat exchange fluid.

3. The microwave pyrolysis reactor according to claim 1 or 2, wherein the microwave distribution element comprises a hollow cylindrical element comprising an external surface facing the inner surface of the housing, and an internal surface facing the inner pipe element.

4. The microwave pyrolysis reactor according to claim 3, wherein the at least one fluid channel is arranged at the external or internal surface of the hollow cylindrical element, or between the external and internal surface.

5. The microwave pyrolysis reactor according to claim 1, wherein the at least one opening is arranged such that microwaves may pass through the at least one opening and into the inner pipe element from at least two opposite radial directions of the microwave distribution element during use.

6. The microwave pyrolysis reactor according to claim 1, wherein the housing comprises an inlet, a solids outlet and a gas outlet, the inlet and the solids outlet are in communication with the first open end and the second open end of the inner pipe element, respectively.

7. The microwave pyrolysis reactor according to claim 1, wherein the at least one opening is arranged such that there is no fully overlapping openings on diametric opposite sides of the microwave distribution element.

8. The microwave pyrolysis reactor according to claim 7, wherein the at least one opening is arranged such that there is no overlap of openings on diametric opposite sides of the microwave distribution element.

9. The microwave pyrolysis reactor according to claim 1, wherein the microwave distribution element comprises multiple openings.

10. The microwave pyrolysis reactor according to claim 1, wherein the microwave distribution element is arranged around the inner pipe element, such that a second annular space is provided between the inner pipe element and the microwave distribution element.

11. The microwave pyrolysis reactor according to claim 1, wherein the inner pipe element is arranged such that the first open end is at a higher vertical level than the second open end during use.

12. A waste treatment system comprising a microwave pyrolysis reactor according to claim 1 and a microwave waveguide connecting a microwave source to the port (13).

13. The microwave pyrolysis reactor according to claim 1, wherein the at least one opening is at least one slot.

14. The microwave pyrolysis reactor according to claim 9, wherein the at least one slot is shaped as at least a part of a helical shaped slot arrangement.

15. The microwave pyrolysis reactor according to claim 11, wherein the inner pipe element is arranged in a vertical direction such that the first open end is at a higher vertical level than the second open end during use.

16. The microwave pyrolysis reactor according to claim 1, wherein the at least one opening of the microwave distribution element allows passage of microwaves having a wavelength λ of between 12 cm and 32 cm.

* * * * *